United States Patent
Johannsen (10) Patent No.: US 9,796,436 B2
(45) Date of Patent: Oct. 24, 2017

(54) UNDERCARRIAGE TRACK LINK ASSEMBLY HAVING OFFSET LINK GAPS

(71) Applicant: Caterpillar Inc., Peoria, IL (US)

(72) Inventor: Eric James Johannsen, Washington, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 14/935,616

(22) Filed: Nov. 9, 2015

(65) Prior Publication Data

US 2017/0129555 A1 May 11, 2017

(51) Int. Cl.
*B62D 55/21* (2006.01)
*B62D 55/06* (2006.01)
*B62D 55/20* (2006.01)

(52) U.S. Cl.
CPC ............. *B62D 55/21* (2013.01); *B62D 55/06* (2013.01); *B62D 55/20* (2013.01)

(58) Field of Classification Search
CPC ...... B62D 55/21; B62D 55/06; B62D 55/213; B62D 55/205
See application file for complete search history.

(56) References Cited

U.S. PATENT DOCUMENTS

| | | | |
|---|---|---|---|
| 1,863,858 A | 6/1932 | Knox | |
| 5,749,635 A | 5/1998 | Umbarger | |
| 6,564,539 B2 | 5/2003 | Bedford et al. | |
| 7,530,650 B2 | 5/2009 | Hannan et al. | |
| 2005/0035655 A1 | 2/2005 | Beckstrom et al. | |
| 2013/0000995 A1 | 1/2013 | Dumitru et al. | |
| 2013/0241277 A1 | 9/2013 | Giusti | |
| 2014/0152086 A1 | 6/2014 | Meyer et al. | |
| 2015/0008730 A1 | 1/2015 | Steiner et al. | |
| 2016/0176454 A1* | 6/2016 | Diekevers | B62D 55/0887 305/202 |
| 2016/0176456 A1* | 6/2016 | Oertley | B62D 55/213 305/186 |
| 2016/0339974 A1* | 11/2016 | Brooks | B62D 55/21 |

FOREIGN PATENT DOCUMENTS

DE   3015209   11/1980

* cited by examiner

*Primary Examiner* — Tony Winner
*Assistant Examiner* — Marlon A Arce
(74) *Attorney, Agent, or Firm* — Finnegan, Henderson, Farabow, Garrett & Dunner LLP (57) ABSTRACT

A track link assembly is disclosed. The track link assembly may have a left link pair having left links. The left links may be disposed in-line with each other and separated by a left link gap. The track link assembly may also have a right link pair having right links. The right links may be disposed in-line with each other and separated by a right link gap. The right link pair may be disposed opposite the left link pair. The track link assembly may have at least one pin configured to pivotably connect the left link pair and the right link pair. The left link gap may be offset from the right link gap relative to an axis of the at least one pin.

18 Claims, 5 Drawing Sheets

UNDERCARRIAGE TRACK LINK ASSEMBLY HAVING OFFSET LINK GAPS

TECHNICAL FIELD

The present disclosure relates generally to an undercarriage track link assembly, and, more particularly, to an undercarriage track link assembly having offset link gaps.

BACKGROUND

Earth-working machines, for example, excavators, continuous miners, and loaders, often include tracked undercarriages that facilitate movement of the machines over ground surfaces. Such track-type machines typically include track assemblies located on either side of the machine. Each track assembly includes a chain having spaced apart pairs of links pinned end-to-end forming a loop that extends around a drive sprocket at one end of the chain and an idler wheel located at the other end of the chain. Some machines may include additional idler wheels or rollers to guide the links from the sprocket end to the idler wheel end. The track link assemblies often also include ground engaging track shoes connected to adjacent pairs of links. An engine associated with the machine typically drives the sprocket. Teeth on the sprocket engage with the links to rotate the chain, pushing the track shoes against a work surface and allowing the machine to be propelled in a forward or rearward direction.

The track links support the weight of the machine. In particular, the weight of the machine is reacted onto the pins connecting the spaced apart links of the track link assembly when the pins pass over an idler wheel or roller. The width of each link is reduced near the location of the pin so that adjacent links may overlap and be connected to each other through the pin. Because of the reduced thickness of the links, reaction of the machine weight on the pins induces high stresses in the links near the pin location. The links and pins may be exposed to these high stresses every time the links and pins pass over an idler wheel or roller. Repeated exposure to these high stresses may cause significant wear and/or breakage of the links. Repair or replacement of the worn or broken links may require expensive and labor intensive service operations, which can place the machine out of service for a long time. Thus, minimizing wear and breakage of the track links becomes important to prevent premature failure of the chains.

U.S. Pat. No. 7,530,650 B2 to Hannan et al. ("the '650 patent") that issued on May 12, 2009 discloses a crawler shoe that attempts to distribute the load from a roller on the shoe uniformly as the roller travels from one shoe to an adjacent shoe. In particular, the '650 patent discloses a shoe for a crawler track. The disclosed shoe has two roller paths to allow a dual rim roller to travel on the track. The '650 patent discloses that the crawler shoe has a body having a leading lug and a trailing lug disposed on either side of the body. The '650 patent also discloses that the leading and trailing lugs are spaced laterally in a direction transverse to the direction of travel to allow adjacent shoes to connect with each other via a pin. Further, the '650 patent discloses that the crawler shoe includes a pair of spaced apart driving lugs that are engaged by teeth on opposite sides of a double sprocket to transfer motive power from the sprocket to the track. The '650 patent discloses that the offset leading and trailing lugs help to transfer the load of the machine more uniformly between adjacent crawler shoes as a roller travels from one shoe to the next.

Although the '650 patent discloses the use of a shoe with offset lugs to distribute load more uniformly, the disclosed shoe may still not be optimal. In particular, the disclosed shoe includes a dual drive lug feature, which may not be useable in track link assemblies in which the sprocket teeth engage with the pins connecting adjacent pairs of links to drive the track. Further, the shoe of the '650 patent requires two separate sprocket wheels to engage with the two separate drive lugs on each shoe. Adding two sprocket wheels to drive each track assembly may increase the cost of manufacturing and maintaining the undercarriage assembly. Moreover, replacing single sprocket wheels on existing machines with two sprocket wheels to drive each track assembly may make it cost prohibitive to implement the disclosed shoe on machines having a single sprocket wheel.

The undercarriage track link assembly of the present disclosure solves one or more of the problems set forth above and/or other problems in the art.

SUMMARY

In one aspect, the present disclosure is directed to a track link assembly. The track link assembly may include a left link pair having left links. The left links may be disposed in-line with each other and separated by a left link gap. The track link assembly may also include a right link pair having right links. The right links may be disposed in-line with each other and separated by a right link gap. The right link pair may be disposed opposite the left link pair. The track link assembly may include at least one pin configured to pivotably connect the left link pair and the right link pair. The left link gap may be offset from the right link gap relative to an axis of the at least one pin.

In another aspect, the present disclosure is directed to a track link. The track link may include an inner surface and an outer surface disposed opposite the inner surface. The inner surface and the outer surface may extend from adjacent a first end to adjacent a second end. The track link may include a shoe face extending between the inner surface and the outer surface. The track link may also include a rail disposed opposite the shoe face. The rail may extend between the inner surface and the outer surface. The rail may be disposed opposite the shoe face. The track link may further include a proximal face disposed adjacent the first end. The proximal face may also be inclined relative to the shoe face and the rail. In addition, the rail may include a distal face disposed adjacent the second end. The distal face may also be disposed generally orthogonal to the shoe face and the rail.

In yet another aspect, the present disclosure is directed to an undercarriage for a machine. The undercarriage may include a frame. The undercarriage may also include an idler assembly disposed at a front end of the frame. Further, the undercarriage may include a sprocket assembly disposed at a rear end of the frame opposite the front end. The sprocket assembly may be configured to propel a track wrapped around the sprocket assembly and the idler assembly. The track may include at least one left link pair having left links. The left links may be disposed in-line with each other and separated by a left link gap. The track link assembly may also include at least one right link pair having right links. The right links may be disposed in-line with each other and separated by a right link gap. The at least one right link pair may be disposed opposite the at least one left link pair. The track link assembly may include at least one pin configured to pivotably connect the at least one left link pair and the at least one right link pair. The left link gap may be offset from the right link gap relative to an axis of the at least one pin.

DETAILED DESCRIPTION

Figure 1:
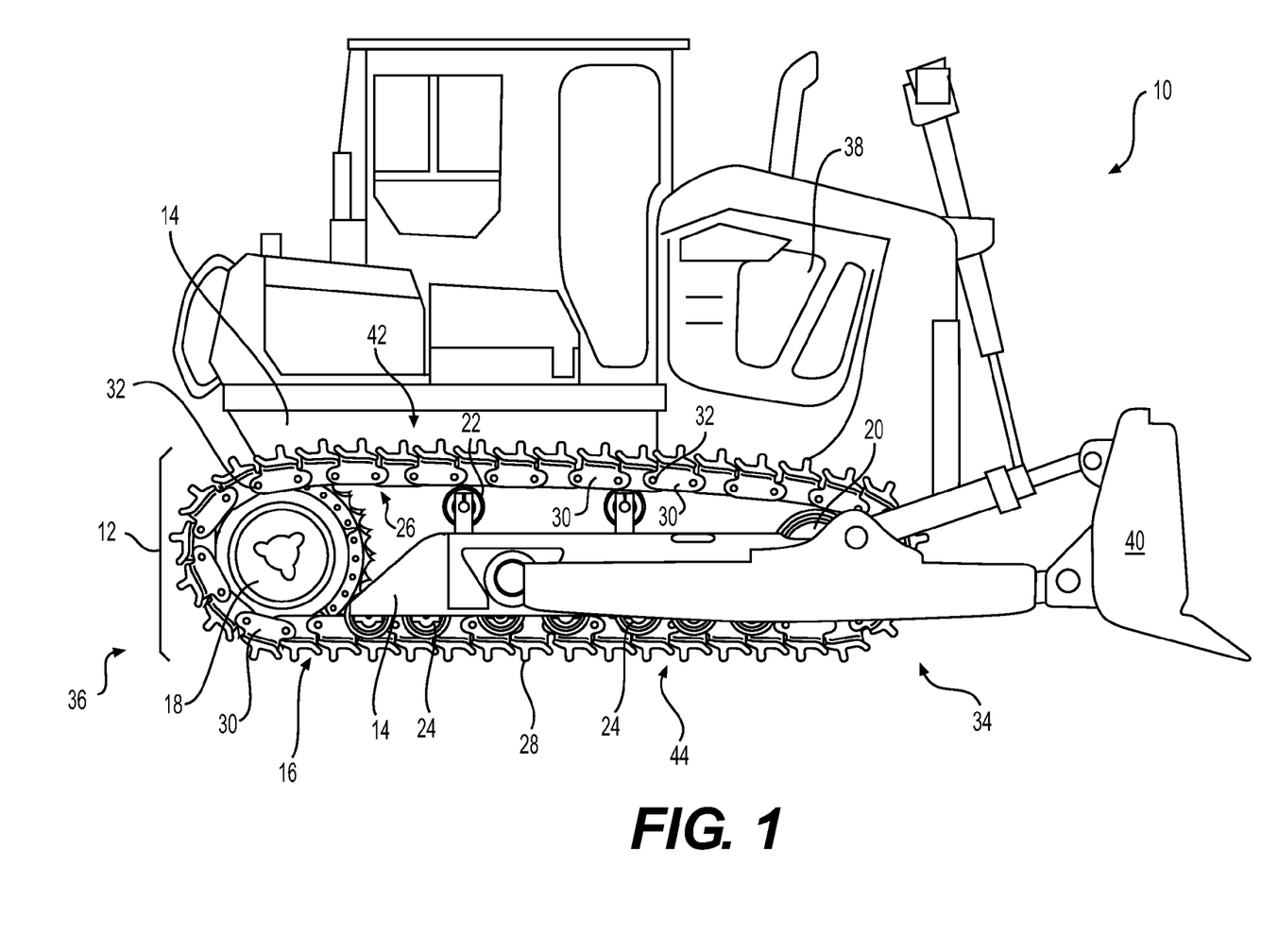
FIG. 1 is a pictorial illustration of an exemplary disclosed machine having an undercarriage.

FIG. 1 illustrates an exemplary embodiment of a machine 10 having an undercarriage 12, which may be used to propel machine 10 in a forward or rearward direction. Machine 10 may perform some type of operation associated with an industry such as mining, construction, or another industry known in the art. For example, as illustrated in FIG. 1, machine 10 may be a loader. It is contemplated, however, that machine 10 may be a tractor, a continuous mining machine, an excavator, a tank, or another machine having track-type traction devices.

Undercarriage 12 may be configured to support machine 10 and may engage the ground, roads, and/or other types of terrain. Undercarriage 12 may include, among other things, frame 14, track 16, sprocket assembly 18, idler assembly 20, one or more upper rollers 22, and one or more lower rollers 24. Sprocket assembly 18, idler assembly 20, upper rollers 22, and lower rollers 24 may be attached to frame 14 of undercarriage 12. Track 16 may wrap around sprocket assembly 18, idler assembly 20, upper rollers 22, and lower rollers 24 to form an endless chain. Track 16 may include track link assembly 26 and one or more shoes 28 secured to track link assembly 26. Track link assembly 26 may include a plurality of individual links 30 connected end-to-end at pivot joints 32. Shoes 28 may be secured to an outer perimeter of track link assembly 26. For example, track 16 may include one shoe 28 attached to each link 30.

Sprocket assembly 18 and idler assembly 20 may be located on opposite ends of undercarriage 12. For example, as illustrated in FIG. 1, idler assembly 20 may be located adjacent front end 34 of frame 14 and sprocket assembly 18 may be located adjacent rear end 36 of frame 14. Sprocket assembly 18 may include one or more projections (not shown) that engage with track 16 and transfer tractive forces from sprocket assembly 18 to track 16. Sprocket assembly 18 may be rotated by power source 38 of machine 10.

Power source 38 may be an engine, which may generate a power output that can be directed through sprocket assembly 18 and track 16 to propel machine 10 in a forward or rearward direction. For example, power source 38 may be any suitable type of internal combustion engine, such as a gasoline, diesel, natural gas, or hybrid-powered engine. It is also contemplated, however, that power source 38 may be driven by electricity. For example, power source 38 may be driven by 1000 W of electrical power. Power source 38 may be configured to deliver power output directly to sprocket assembly 18. Additionally or alternatively, power source 38 may be configured to deliver power output to a generator (not shown), which may in turn drive one or more electric motors (not shown) coupled to sprocket assembly 18. According to yet another embodiment, power source 38 may deliver power output to a hydraulic motor (not shown) fluidly coupled to a hydraulic pump (not shown) and configured to convert a fluid pressurized by the pump into a torque output, which may be directed to sprocket assembly 18. Power source 38 may also provide power to move and/or manipulate work tool 40 associated with machine 10.

Upper and lower rollers 22, 24 may guide track 16 between sprocket assembly 18 and idler assembly 20. For example, upper roller 22 may guide track 16 at an upper track side 42 of frame 14. To do so, upper roller 22 may extend upward from frame 14 and engage an inner portion of track link assembly 26. Upper roller 22 may have various configurations. Lower rollers 24 may guide track 16 at a lower track side 44 of frame 14. Lower rollers 24 may each be suspended from frame 14. Lower rollers 24 may ride on and guide links 30 of track link assembly 26 as track 16 travels around sprocket assembly 18 and idler assembly 20. Although FIG. 1 illustrates upper and lower rollers 22, 24 to guide track link assembly 26, it is contemplated that undercarriage 12 may additionally or alternatively include skids (not shown) and track link assembly 26 may slide on the skids.

Figure 2:
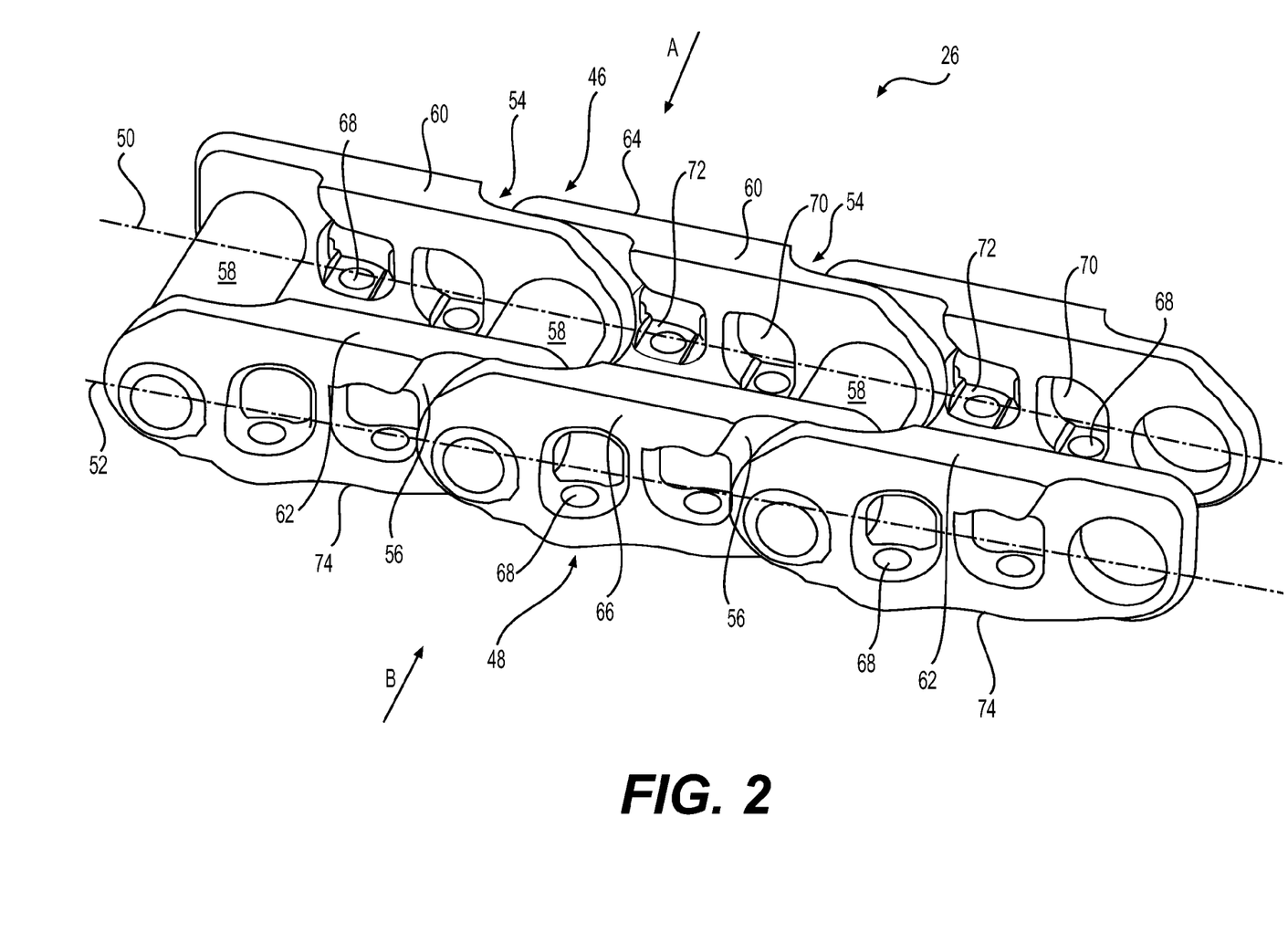
FIG. 2 is a pictorial illustration of a portion of an exemplary disclosed track link assembly that may be used with the machine of FIG. 1.

FIG. 2 shows an exemplary portion of track link assembly 26, which may include left links 46 and right links 48. Left links 46 may be disposed in-line with each other along left longitudinal axis 50 oriented generally parallel to a lengthwise direction of track 16. Likewise right links 48 may be disposed in-line with each other along right longitudinal axis 52 oriented generally parallel to the lengthwise travel direction of track 16. Left and right longitudinal axes 50, 52 may be disposed generally parallel to each other. Left links 46 may be separated from each other by left link gaps 54 between adjacent pairs of left links. Likewise, right links 48 may be separated from each other by right link gaps 56 between adjacent pairs of right links.

As used in this disclosure, the terms "about" and "generally" may indicate typical manufacturing tolerances and dimensional rounding. Thus, for example, the terms about and generally may represent dimensional variations of ±0.1 mm, angular variations of ±0.1°, etc. Additionally, although this disclosure uses the terms left and right to refer to, for example, the two sets of links 46, 48 in FIG. 2, the terms left and right should not be construed as connoting specific positions relative to machine 10. The terms left and right in this disclosure are used solely to refer to links disposed opposite to each other within track link assembly 26.

Adjacent left links 46 and right links 48 may be pivotably connected to each other with pins 58 at pivot joints 32. Pins 58 may also connect left links 46 with right links 48 at pivot joints 32. Left and right links 46, 48 may include left and right rails 60, 62, respectively, which may be configured to engage with and support upper and lower rollers 22, 24 (referring to FIG. 1) of undercarriage 12 during operation of machine 10. As also shown in FIG. 2, left and right links 46, 48 may have contoured surfaces with a plurality of different recesses and projections. For example, left and right rails 60, 62 of each left and right links 46, 48, respectively may be generally wider at a middle section, and narrower at opposing ends, which may be offset from each other. This may help ensure that left and right rails 60, 62 present substantially continuous and straight left and right outer guide surfaces 64, 66 with which upper and lower rollers 22, 24 can remain continuously engaged.

Opposite left and right rails 60, 62, left and right links 46, 48, respectively, may include provisions for attaching shoes 28 (see FIG. 1) to left and right links 46, 48. In particular, left and right links 46, 48 may include a plurality of holes 68 configured to receive fasteners (not shown) passing from an associated shoe 28 through left or right links 46, 48. In some exemplary embodiments, holes 68 may be threaded to receive the fasteners. In other exemplary embodiments, one or more windows 70 may provide seating surfaces 72 for nuts or other devices (not shown) that may engage with distal ends of the fasteners. To secure shoe 28 to a particular left or right link 46, 48, shoe 28 may be placed against shoe faces 74 of left and right links 46, 48, and fasteners may be inserted through shoe 28 and holes 68 in left and right links 46, 48 to either engage with threads in holes 68 or with nuts disposed within windows 70.

Figure 3:
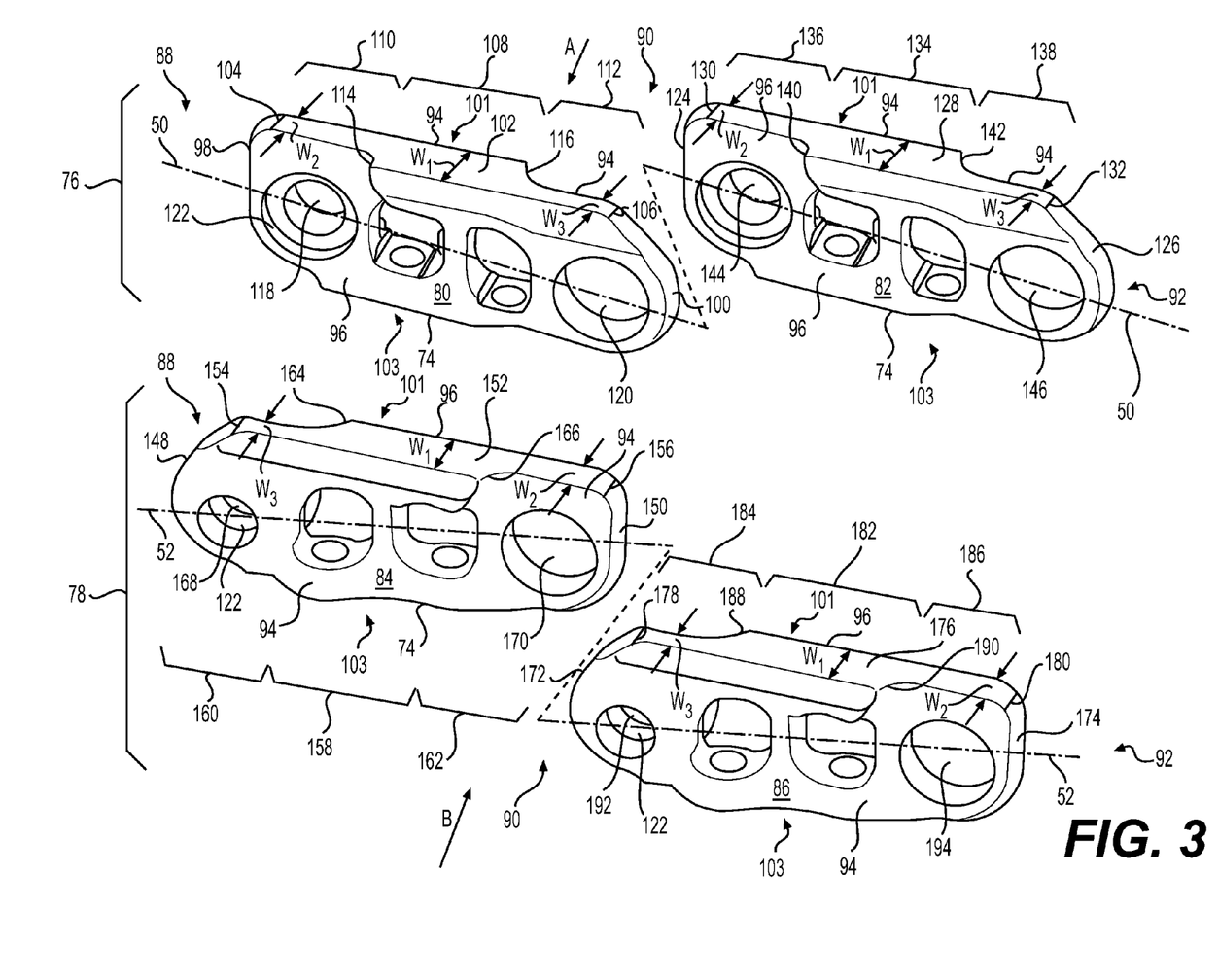
FIG. 3 is an exploded pictorial view of a portion of the track link assembly of FIG. 2.

FIG. 3 illustrates an exploded pictorial view of a portion of track link assembly 26. For example, track link assembly 26 may include left link pair 76 and right link pair 78 disposed opposite to and spaced apart from left link pair 76. Left link pair 76 may include first left link 80 and second left link 82 disposed in-line with each other. Right link pair 78 may include first right link 84 and second right link 86 disposed in-line with each other. First left link 80 may extend from adjacent first end 88 to adjacent second end 90. Second left link 82 may extend from adjacent second end 90 to adjacent third end 92. Second end 90 may be disposed between first end 88 and third end 92.

First left link 80 may include outer surface 94 and inner surface 96 disposed opposite outer surface 94. Outer surface 94 and inner surface 96 of first left link 80 may extend in a lengthwise direction from adjacent first end 88 to adjacent second end 90. Second left link 82, first right link 84, and second right link 86 may each include outer surface 94 and inner surface 96, similar to that of first left link 80. As also illustrated in FIGS. 2 and 3, inner surface 96 of second left link 82 may abut on outer surface 94 of first left link 80 adjacent second end 90. Likewise, inner surface 96 of second right link 86 may abut on outer surface 94 of first right link 84 adjacent second end 90.

As illustrated in FIG. 3, first left link 80 may include first proximal face 98 disposed adjacent first end 88 and first distal face 100 disposed adjacent second end 90. First proximal face 98 and first distal face 100 may be configured to join outer and inner surfaces 94, 96. First left link 80 may also include first left rail 102 disposed on first side 101 of first left link 80. First left rail 102 may extend from first proximal face 98 to first distal face 100. First left link 80 may also include shoe face 74 disposed on second side 103 of first left link 80 opposite first side 101. Shoe face 74 may extend from first proximal face 98 to first distal face 100. First left rail 102 and shoe face 74 may also be configured to join outer and inner surfaces 94, 96. In one exemplary embodiment as illustrated in FIG. 3, first proximal face 98 may be disposed generally orthogonal to first left rail 102 and shoe face 74. First distal face 100 may have a curvilinear shape and may be inclined relative to first left rail 102 and shoe face 74. It is also contemplated that first proximal face 98 may be inclined relative to first left rail 102 and shoe face 74. It is further contemplated that an angle of inclination of first proximal face 98 relative to first left rail 102, in a plane generally parallel to outer and inner surfaces 94, 96, may be larger than an angle of inclination of first distal face 100 relative to first left rail 102.

First left rail 102 may extend from first leading end 104 disposed adjacent first end 88 to first trailing end 106 disposed adjacent second end 90. First leading end 104 may be defined by an intersection of first proximal face 98 and first left rail 102. First trailing end 106 may be defined by an intersection of first left rail 102 and first distal face 100. First left rail 102 may include first middle section 108, first outer section 110, and second outer section 112. First middle section 108 may extend between first inner end 114 and first outer end 116, both of which may be disposed between first leading end 104 and first trailing end 106. For example, first inner end 114 may be disposed nearer to first leading end 104 than to first trailing end 106. First outer end 116 may be disposed between first inner end 114 and first trailing end 106. First outer section 110 may extend from first leading end 104 to first inner end 114. Second outer section 112 may extend from first outer end 116 to first trailing end 106.

First outer section 110 and second outer section 112 may be offset from each other along a width of first left rail 102. In one exemplary embodiment as illustrated in FIG. 3, first outer section 110 may be offset from left longitudinal axis 50 towards outer surface 94 and second outer section 112 may be offset from left longitudinal axis 50 towards inner surface 96. First middle section 108 of first left rail 102 may have a width "$W_1$" between outer surface 94 and inner surface 96. First outer section 110 of first left rail 102 may have a width "$W_2$," which may be smaller than width $W_1$. Likewise, second outer section 112 of first left rail 102 may have a width "$W_3$," which may be smaller than width $W_1$. Widths $W_2$ and $W_3$ may be equal or unequal.

First left link 80 may include first proximal opening 118 disposed adjacent first end 88 and first distal opening 120 disposed adjacent second end 90. First proximal opening 118 may extend from inner surface 96 to outer surface 94 of first left link 80. Likewise, first distal opening 120 may extend from inner surface 96 to outer surface 94 of first left link 80. In one exemplary embodiment as illustrated in FIG. 3, a diameter of first proximal opening 118 may be smaller than a diameter of first distal opening 120. First proximal opening 118 of first left link 80 may also include counterbore 122. In one exemplary embodiment, a diameter of counterbore 122 may be about equal to the diameter of first distal opening 120. Diameters of first proximal opening 118, first distal opening 120, and counterbore 122 may be configured to receive pin 58.

Second left link 82 may have a structure similar to that of second left link 82. For example, second left link 82 may include second proximal face 124 disposed adjacent second end 90 and second distal face 126 disposed adjacent third end 92. In one exemplary embodiment, second proximal face 124 may be disposed adjacent first outer end 116 (see FIGS. 2, 3) of first left link 80. Second proximal face 124 and second distal face 126 may be configured to join outer and inner surfaces 94, 96. Second left link 82 may also include second left rail 128 disposed on first side 101 of second left link 82. Second left rail 128 may extend from second proximal face 124 to second distal face 126. Second left link 82 may also include shoe face 74 disposed on second side 103 of second left link 82 opposite first side 101. Shoe face 74 may extend from second proximal face 124 to second distal face 126. Second left rail 128 and shoe face 74 may also be configured to join outer and inner surfaces 94, 96. In one exemplary embodiment as illustrated in FIG. 3, second proximal face 124 may be disposed generally orthogonal to second left rail 128 and shoe face 74. Second distal face 126 may have a curvilinear shape and may be inclined relative to second left rail 128 and shoe face 74. It is also contemplated that second proximal face 124 may be inclined relative to second left rail 128 and shoe face 74. It is further contemplated that an angle of inclination of second proximal face 124 relative to second left rail 128, in a plane generally parallel to outer and inner surfaces 94, 96, may be larger than an angle of inclination of second distal face 126 relative to second left rail 128.

Second left rail 128 may extend from second leading end 130 disposed adjacent second end 90 to second trailing end 132 disposed adjacent third end 92. Second leading end 130 may be defined by an intersection of second proximal face 124 and second left rail 128. Second trailing end 132 may be defined by an intersection of second left rail 128 and second distal face 126. Second left rail 128 may include second middle section 134, third outer section 136, and fourth outer section 138. Second middle section 134 may extend between second inner end 140 and second outer end 142 both of which may be disposed between second leading end 130 and second trailing end 132. For example, second inner end 140 may be disposed nearer to second leading end 130 than to second trailing end 132. Second outer end 142 may be disposed between second inner end 140 and second trailing end 132. Third outer section 136 may extend from second leading end 130 to second inner end 140. Fourth outer section 138 may extend from second outer end 142 to second trailing end 132.

Third outer section 136 and fourth outer section 138 may be offset from each other along a width of second left rail 128. In one exemplary embodiment as illustrated in FIG. 3, third outer section 136 may be offset from left longitudinal axis 50 towards outer surface 94 and fourth outer section 138 may be offset from left longitudinal axis 50 towards inner surface 96. Second middle section 134 of second left rail 128 may have a width "$W_1$" between outer surface 94 and inner surface 96. Third outer section 136 of second left rail 128 may have a width "$W_2$," which may be smaller than width $W_1$. Likewise, fourth outer section 138 of second left rail 128 may have a width "$W_3$," which may be smaller than width $W_1$. Widths $W_2$ and $W_3$ may be equal or unequal.

Second left link 82 may include second proximal opening 144 disposed adjacent second end 90 and second distal opening 146 disposed adjacent third end 92. Second proximal opening 144 may extend from inner surface 96 to outer surface 94 of second left link 82. Likewise, second distal opening 146 may extend from inner surface 96 to outer surface 94 of second left link 82. In one exemplary embodiment as illustrated in FIG. 3, a diameter of second proximal opening 144 may be smaller than a diameter of second distal opening 146. Second proximal opening 144 of second left link 82 may also include counterbore 122. In one exemplary embodiment, a diameter of counterbore 122 may be about equal to the diameter of second distal opening 146. Diameters of counterbore 122, second proximal opening 144, and second distal opening 146 may be configured to receive pin 58.

First right link 84 may include first proximal face 148 disposed adjacent first end 88 and first distal face 150 disposed adjacent second end 90. First proximal face 148 and first distal face 150 may be configured to join outer and inner surfaces 94, 96. First right link 84 may also include first right rail 152 disposed on first side 101 of first right link 84. First right rail 152 may extend from first proximal face 148 to first distal face 150. First right link 84 may also include shoe face 74 disposed on second side 103 of first right link 84 opposite first side 101. Shoe face 74 may extend from first proximal face 148 to first distal face 150. First right rail 152 and shoe face 74 may also be configured to join outer and inner surfaces 94, 96. In one exemplary embodiment as illustrated in FIG. 3, first proximal face 148 may have a curvilinear shape and may be inclined relative to first right rail 152 and shoe face 74. First distal face 150 may be disposed generally orthogonal to first right rail 152 and shoe face 74. It is also contemplated that first distal face 150 may be inclined relative to first right rail 152 and shoe face 74. It is further contemplated that an angle of inclination of first distal face 150 relative to first right rail 152 in a plane generally parallel to outer and inner surfaces 94, 96, may be larger than an angle of inclination of first proximal face 148 relative to first right rail 152.

First right rail 152 may extend from first leading end 154 disposed adjacent first end 88 to first trailing end 156 disposed adjacent second end 90. First leading end 154 may be defined by an intersection of first proximal face 148 and first right rail 152. First trailing end 156 may be defined by an intersection of first right rail 152 and first distal face 150. First right rail 152 may include first middle section 158, first outer section 160, and second outer section 162. First middle section 158 may extend between first inner end 164 to first outer end 166 both of which may be disposed between first leading end 154 and first trailing end 156. For example, first inner end 164 may be disposed nearer to first leading end 154 than to first trailing end 156. First outer end 166 may be disposed between first inner end 164 and first trailing end 156. First outer section 160 may extend from first leading end 154 to first inner end 164. Second outer section 162 may extend from first outer end 166 to first trailing end 156.

First outer section 160 and second outer section 162 may be offset from each other along a width of first right rail 152. In one exemplary embodiment as illustrated in FIG. 3, first outer section 110 may be offset from left longitudinal axis 50 towards outer surface 94 and second outer section 112 may be offset from left longitudinal axis 50 towards inner surface 96. As also illustrated in FIGS. 2 and 3, second outer section 112 of first left link 80 and second outer section 162 of first right link 84 may be offset towards each other. Thus, for example, a distance between second outer section 112 of first left link 80 and second outer section 162 of first right link 84 may be smaller than a distance between first outer section 110 of first left link 80 and first outer section 160 of first right link 84. First middle section 158 of first right rail 152 may have a width $W_1$ between outer surface 94 and inner surface 96. First outer section 160 of first right rail 152 may have a width $W_3$, which may be smaller than width $W_1$. Likewise, second outer section 162 of first right rail 152 may have a width $W_2$, which may be smaller than width $W_1$. Widths $W_2$ and $W_3$ may be equal or unequal.

First right link 84 may include first proximal opening 168 disposed adjacent first end 88 and first distal opening 170 disposed adjacent second end 90. First proximal opening 168 may extend from inner surface 96 to outer surface 94 of first right link 84. Likewise, first distal opening 170 may extend from inner surface 96 to outer surface 94 of first right link 84. In one exemplary embodiment as illustrated in FIG. 3, a diameter of first proximal opening 168 may be smaller than a diameter of first distal opening 170. First proximal opening 168 of first right link 84 may also include counterbore 122. In one exemplary embodiment, a diameter of counterbore 122 may be about equal to the diameter of first distal opening 170. Diameters of counterbore 122, first proximal opening 168, and first distal opening 170 may be configured to receive pin 58.

Second right link 86 may have a structure similar to that of first right link 84. For example, second right link 86 may include second proximal face 172 disposed adjacent second end 90 and second distal face 174 disposed adjacent third end 92. In one exemplary embodiment, second proximal face 172 may be disposed adjacent first outer end 166 (see FIGS. 2 and 3) of first right link 84. Second proximal face 172 and second distal face 174 may be configured to join outer and inner surfaces 94, 96. Second right link 86 may also include second right rail 176 disposed on first side 101 of second right link 86. Second right rail 176 may extend from second proximal face 172 to second distal face 174. Second right link 86 may also include shoe face 74 disposed on second side 103 of second right link 86 opposite first side 101. Shoe face 74 may extend from second proximal face 172 to second distal face 174. Second right rail 176 and shoe face 74 may be configured to join outer and inner surfaces 94, 96. In one exemplary embodiment as illustrated in FIG. 3, second proximal face 172 may have a curvilinear shape and may be inclined relative to second right rail 176 and shoe face 74. Second distal face 174 may be disposed generally orthogonal to second right rail 176 and shoe face 74. It is also contemplated that second distal face 174 may be inclined relative to second right rail 176 and shoe face 74. It is further contemplated that an angle of inclination of second distal face 174 relative to second right rail 176, in a plane generally parallel to outer and inner surfaces 94, 96, may be larger than an angle of inclination of second proximal face 172 relative to second right rail 176.

Second right rail 176 may extend from second leading end 178 disposed adjacent second end 90 to second trailing end 180 disposed adjacent third end 92. Second leading end 178 may be defined by an intersection of second proximal face 172 and second right rail 176. Second trailing end 180 may be defined by an intersection of second right rail 176 and second distal face 174. Second right rail 176 may include second middle section 182, third outer section 184, and fourth outer section 186. Second middle section 182 may extend between second inner end 188 and second outer end 190 both of which may be disposed between second leading end 178 and second trailing end 180. For example, second inner end 188 may be disposed nearer to second leading end 178 than to second trailing end 180. Second outer end 190 may be disposed between second inner end 188 and second trailing end 180. Third outer section 184 may extend from second leading end 178 to second inner end 188. Fourth outer section 186 may extend from second outer end 190 to second trailing end 180.

Third outer section 184 and fourth outer section 186 may be offset from each other along a width of second right rail 176. In one exemplary embodiment as illustrated in FIG. 3, third outer section 184 may be offset from left longitudinal axis 50 towards outer surface 94 and fourth outer section 186 may be offset from left longitudinal axis 50 towards inner surface 96. As also illustrated in FIGS. 2 and 3, fourth outer section 138 of second left link 82 and fourth outer section 186 of second right link 86 may be offset towards each other. Thus, for example, a distance between fourth outer section 138 of second left link 82 and fourth outer section 186 of second right link 86 may be smaller than a distance between third outer section 136 of second left link 82 and third outer section 184 of second right link 86. Second middle section 182 of second right rail 176 may have a width $W_1$ between outer surface 94 and inner surface 96. Third outer section 184 of second right rail 176 may have a width $W_3$, which may be smaller than width $W_1$. Likewise, fourth outer section 186 of second right rail 176 may have a width $W_2$, which may be smaller than width $W_1$. Widths $W_2$ and $W_3$ may be equal or unequal.

Second right link 86 may include second proximal opening 192 disposed adjacent second end 90 and second distal opening 194 disposed adjacent third end 92. Second proximal opening 192 may extend from inner surface 96 to outer surface 94 of second right link 86. Likewise, second distal opening 194 may extend from inner surface 96 to outer surface 94 of second right link 86. In one exemplary embodiment as illustrated in FIG. 3, a diameter of second proximal opening 192 may be smaller than a diameter of second distal opening 194. Second proximal opening 192 of second right link 86 may also include counterbore 122. In one exemplary embodiment, a diameter of counterbore 122 may be about equal to the diameter of second distal opening 194. Diameters of counterbore 122, second proximal opening 192, and second distal opening 194 may be configured to receive pin 58.

Figure 4:
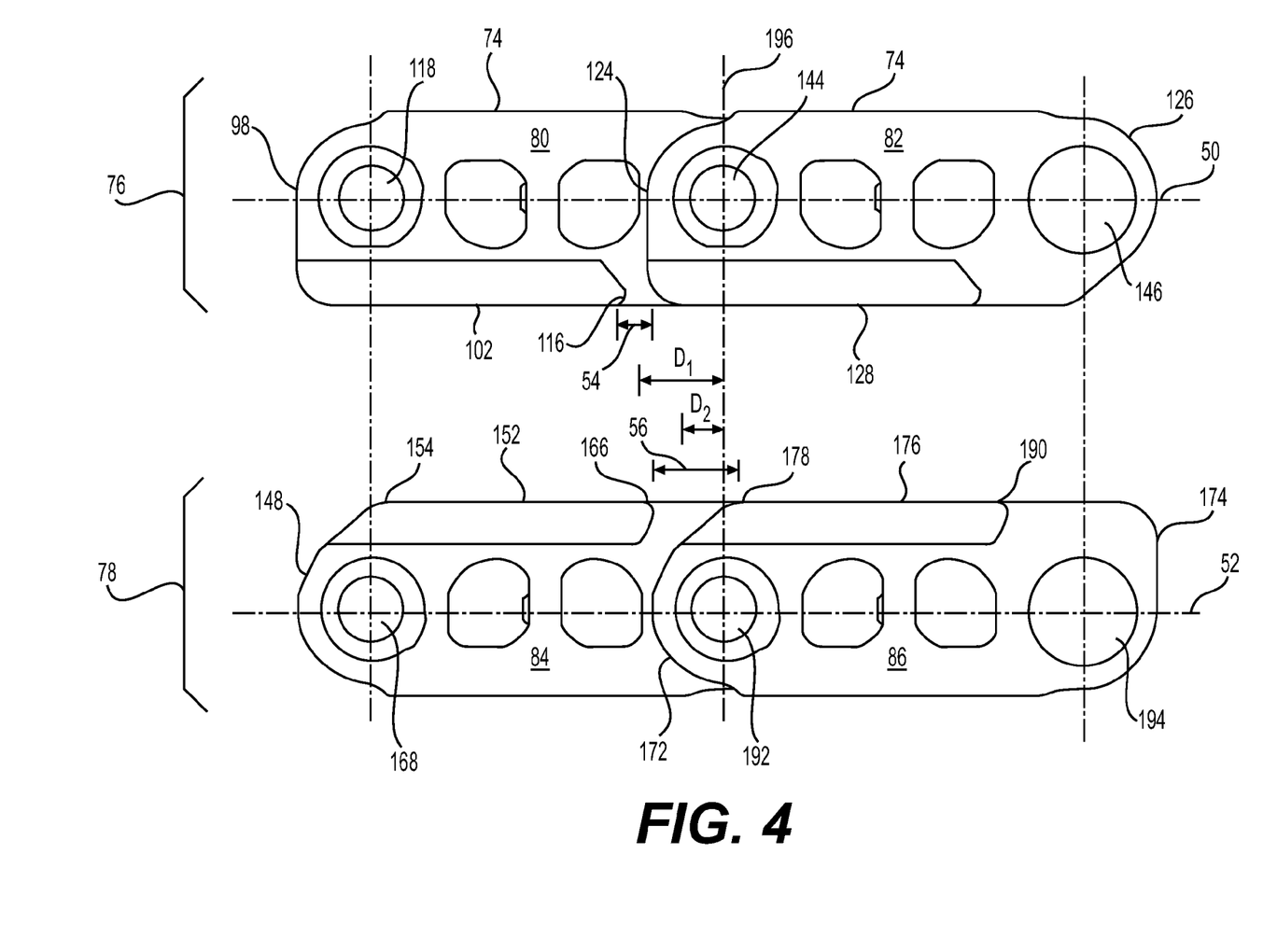
FIG. 4 is a side-view illustration of the portion of the track link assembly of FIG. 3.

FIG. 4 illustrates side views of left link pair 76 and right link pair 78. For example, FIG. 4 illustrates a side view of left link pair 76 from a direction A (as shown in FIGS. 2, 3) but with left link pair 76 rotated about 180° around left longitudinal axis 50. FIG. 4 also illustrates a side view of right link pair 78 from a direction B (as shown in FIGS. 2, 3). As illustrated in FIG. 4, left link gap 54 may extend between first outer end 116 of first left rail 102 and second proximal face 124 of second left link 82. Right link gap 56 may extend between first outer end 166 of first right rail 152 and second leading end 178 of second right rail 176. In one exemplary embodiment as illustrated in FIG. 4, left link gap 54 may be offset from right link gap 56 relative to a longitudinal axis 196 of pin 58 along a lengthwise direction of track 16, which may be generally parallel to left and right longitudinal axes 50, 52. For example, a center point of left link gap 54 may be disposed at a distance "$D_1$" from longitudinal axis 196 and a center point of right link gap 56 may be disposed at a distance "$D_2$" from the longitudinal axis 196. As illustrated in FIG. 4, distance $D_1$ may be different from distance $D_+$. As also illustrated in FIG. 4, left link gap 54 may be smaller than right link gap 56. It is contemplated, however, that left link gap 54 may be about equal to right link gap 56 (see FIG. 2). It is further contemplated that left link gap 54 may be larger than right link gap 56. As further illustrated in FIG. 4, right link gap 56 may straddle longitudinal axis 196 of pin 58, whereas left link gap 54 may be disposed to one side of longitudinal axis 196. It is contemplated that both left link gap 54 and right link gap 56 may be disposed on a same side of longitudinal axis 196 of pin 58.

Figure 5:
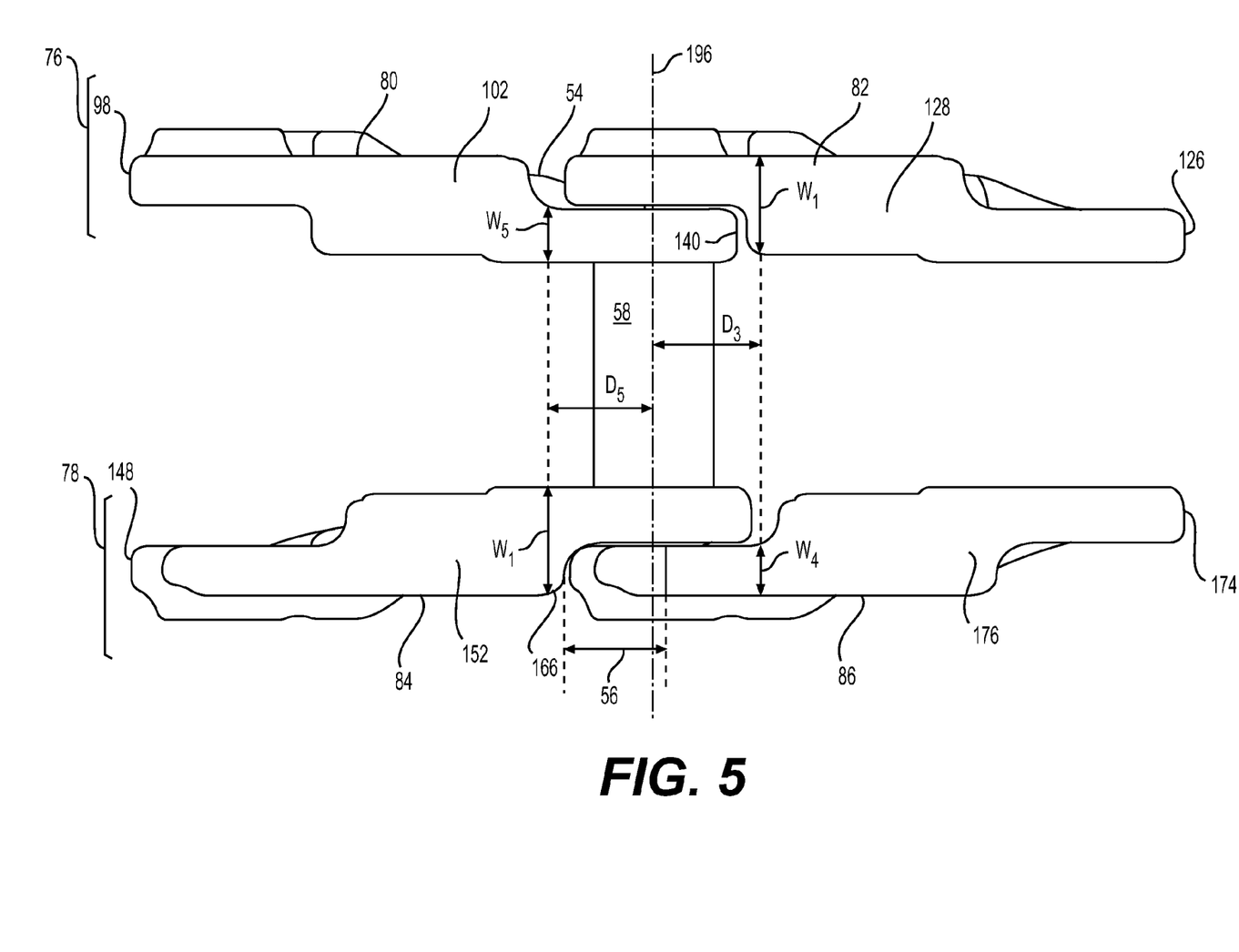
FIG. 5 is a top-view illustration of the portion of the track link assembly of FIG. 3.

FIG. 5 illustrates a top view of left link pair 76 and right link pair 78. As illustrated in FIG. 5, second left rail 128 of second left link 82 may have width $W_1$ at second left rail inner end 140, whereas second right rail 176 of second right link 86 may have width "$W_4$," at the same distance "$D_3$" from longitudinal axis 196 of pin 58. As illustrated in FIG. 5, width $W_4$ may be less than width $W_1$ at the same distance $D_3$ from longitudinal axis 196 of pin 58. Thus, stresses generated in links 80, 82, 84, 86 may be smaller than the stresses that would have been generated in links 80, 82, 84, 86 if the left links 80, 82 and right links 84, 86 had been mirror images of each other. In particular, if the left links 80, 82 and right links 84, 86 had been mirror images of each other, the widths of both second left link 82 and second right link 86 at distance $D_3$ from longitudinal axis 196 would have been the same and smaller than width $W_1$, which in turn would have produced higher stresses.

As also illustrated in FIG. 5, first right rail 152 of first right link 84 may have width $W_1$ at first outer end 166 of first right rail 152, whereas first left rail 102 of second left link 82 may have width "$W_5$," at the same distance "$D_5$" from longitudinal axis 196 of pin 58. As illustrated in FIG. 5, width $W_5$ may be less than width $W_1$ at the same location along a length of track 16. Thus, stresses generated in links 80, 82, 84, 86 may be smaller than the stresses that would have been generated in links 80, 82, 84, 86 if the left links 80, 82 and right links 84, 86 had been mirror images of each other. In particular, if the left links 80, 82 and right links 84, 86 had been mirror images of each other, the widths of both first left link 80 and first right link 84 at distance $D_5$ from longitudinal axis 196 would have been the same and smaller than width $W_1$, which in turn would have produced higher stresses.

Although only one each of left link pair 76 and right link pair 78 have been described above in detail with reference to FIGS. 2-5, one of ordinary skill in the art would recognize that track 16 may include a plurality of left and right link pairs 76, 78 connected end-to-end via pins 58 to form track 16.

INDUSTRIAL APPLICABILITY

The undercarriage of the present disclosure has applications in a variety of machines in which links of the undercarriage assembly are subjected to heavy loading and wear. The disclosed undercarriage assembly may be implemented on any machine having a tracked undercarriage, where it may be advantageous to help reduce an amount of wear and breakage of links of the undercarriage.

Referring to FIG. 4, left link gap 54 may be lengthwise offset from right link gap 56 in the disclosed track link assembly 26. Offsetting left link gap 54 from right link gap 56 may help ensure that a width $W_1$ of second left link 82 and first right link 84 may be available to react a load exerted on links 80, 82, 84, 86 as pin 58 passes over an upper roller 22 or lower roller 24. Specifically, if left link gap 54 and right link gap 56 were not offset, but aligned, second left link 82 and first right link 84 would have widths $W_4$ and $W_5$ available at second inner end 140 of second left rail 128 and first outer end 166 of first right rail 152, respectively. Because widths $W_4$ and $W_5$ may be smaller than $W_1$, the stresses induced in links 80, 82, 84, 86 would be higher than when left link gap 54 and right link gap 56 are offset from each other as illustrated in the exemplary embodiment of FIG. 5. By offsetting left link gap 54 and right link gap 56, thereby making an increased width $W_1$ of second left rail 128 and first right rail 152 available to react the load on pin 58, the disclosed left and right link pairs 76, 78 may help reduce an amount of stress in links 80, 82, 84, 86, which in turn may reduce an amount of wear and a potential for breakage of links 80, 82, 84, 86.

Additionally, the disclosed left and right link pairs 76, 78 may be advantageously implemented in any existing machine having a tracked undercarriage 12. Because the disclosed left and right link pairs 76, 78 do not alter the geometry and/or arrangement of pins 58 in track 16, no modification of sprocket assembly 18 is required and the same sprocket assembly 18 may be used to drive track 16 containing left and right link pairs 76, 78. Thus, the disclosed left and right link pairs 76, 78 may be implemented on machine 10 without the need to modify sprocket assembly 18, idler assembly 20, upper rollers 22, and/or lower rollers 24.

It will be apparent to those skilled in the art that various modifications and variations can be made to the disclosed undercarriage assembly without departing from the scope of the disclosure. Other embodiments of the undercarriage assembly will be apparent to those skilled in the art from consideration of the specification and practice of the undercarriage assembly disclosed herein. It is intended that the specification and examples be considered as exemplary only, with a true scope of the disclosure being indicated by the following claims and their equivalents.

What is claimed is:

1. A track link assembly, comprising:
a left link pair including left links disposed in-line with each other and separated by a left link gap;
a right link pair including right links disposed in-line with each other and separated by a right link gap, the right link pair disposed opposite the left link pair;
at least one pin configured to pivotably connect the left link pair and the right link pair, wherein the left link gap is offset from the right link gap relative to an axis of the at least one pin.

2. The track link assembly of claim 1, wherein the left link gap is smaller than the right link gap.

3. The track link assembly of claim 1, wherein
the left link gap is disposed on one side of the axis of the at least one pin, and
the right link gap straddles the axis of the at least one pin.

4. The track link assembly of claim 1, wherein the left link gap and the right link gap are disposed on a same side of the axis of the at least one pin.

5. The track link assembly of claim 1, wherein the left link pair includes:
a first left link extending from adjacent a first end to adjacent a second end, the first left link including a first inner surface and a first outer surface disposed opposite the first inner surface; and
a second left link extending from adjacent the second end to adjacent a third end, the second left link including a second inner surface and a second outer surface disposed opposite the second inner surface,
wherein the second inner surface abuts on the first outer surface adjacent the second end.

6. The track link assembly of claim 5, wherein
the first left link includes:
a first proximal face adjacent the first end;
a first distal face adjacent the second end; and
a first left rail extending from a first leading end adjacent the first end to a first trailing end adjacent the second end; and
the second left link includes:
a second proximal face adjacent the second end;
a second distal face adjacent the third end; and
a second left rail extending from a second leading end adjacent the second end to a second trailing end adjacent the third end.

7. The track link assembly of claim 6, wherein
the first proximal face is generally orthogonal relative to the first left rail; and
the first distal face is inclined relative to the first left rail.

8. The track link assembly of claim 6, wherein
the first left rail includes a middle section extending from a first inner end to a first outer end,
the first inner end is disposed between the first leading end and the first trailing end,
the first outer end is disposed between the first inner end and the first trailing end, and
the left link gap extends from the first outer end to the second proximal face.

9. The track link assembly of claim 6, wherein
the first left link includes:
a first proximal opening disposed adjacent the first end; and
a first distal opening disposed adjacent the second end,
the second left link includes:
a second proximal opening disposed adjacent the second end; and a second distal opening disposed adjacent the third end, and the first distal opening and the second proximal opening are axially aligned to receive the at least one pin.

10. The track link assembly of claim 9, wherein the first distal opening has a first diameter larger than a second diameter of the second proximal opening.

11. The track link assembly of claim 10, wherein the first proximal opening has a counterbore having a third diameter about equal to the first diameter.

12. The track link assembly of claim 1, wherein the right link pair includes:
 a first right link extending from adjacent a first end to adjacent a second end; and
 a second right link extending from adjacent the second end to adjacent a third end, the second end being disposed between the first end and the third end, wherein
 an inner surface of the second right link abuts on an outer surface of the first right link adjacent the second end.

13. The track link assembly of claim 12, wherein
 the first right link includes a first right rail extending from a first leading end adjacent the first end to a first trailing end adjacent the second end, the first right rail having a middle section extending from a first inner end to a first outer end, the first inner end and the first outer end being disposed between the first leading end and the first trailing end,
 the second right link includes a second right rail extending from a second leading end adjacent the second end to a second trailing end adjacent the third end, and
 the right link gap extends between the first outer end and the second leading end.

14. The track link assembly of claim 13, wherein the first right rail further includes:
 a first outer section extending from the first leading end to the first inner end; and
 a second outer section extending from the first outer end to the first trailing end, wherein the first outer section is offset relative to the second outer section.

15. A track link, comprising:
 an inner surface and an outer surface disposed opposite the inner surface, the inner surface and the outer surface extending from adjacent a first end to adjacent a second end;
 a shoe face extending between the inner surface and the outer surface;
 a rail disposed opposite the shoe face and extending between the inner surface and the outer surface;

a proximal face disposed adjacent the first end, the proximal face being inclined relative to the shoe face and the rail;
 a distal face disposed adjacent the second end, the distal face being disposed generally orthogonal to the shoe face and the rail;
 a proximal opening disposed adjacent the first end and extending from the inner surface to the outer surface; and
 a distal opening disposed adjacent the second end and extending from the inner surface to the outer surface, the proximal opening having a first diameter smaller than a second diameter of the distal opening;
 wherein the proximal opening includes a counterbore having a third diameter about equal to the second diameter.

16. The track link of claim 15, wherein the rail extends from a leading end adjacent the first end to a trailing end adjacent the second end, and includes:
 a middle section extending from an inner end to an outer end, the inner end and the outer end being disposed between the leading end and the trailing end;
 a first outer section extending from the leading end to the inner end; and
 a second outer section extending from the outer end to the trailing end, wherein the first outer section and the second outer section are offset relative to each other.

17. The track link of claim 16, wherein a width of the middle section is larger than widths of the first outer section and the second outer section.

18. An undercarriage for a machine, comprising:
 a frame;
 an idler assembly disposed at a front end of the frame; and
 a sprocket assembly disposed at a rear end of the frame opposite the front end, the sprocket assembly being configured to propel a track wrapped around the sprocket assembly and the idler assembly, the track including:
 at least one left link pair including left links disposed in-line with each other and separated by a left link gap;
 at least one right link pair including right links disposed in-line with each other and separated by a right link gap, the at least one right link pair disposed opposite the at least one left link pair; and
 at least one pin configured to pivotably connect the at least one left link pair and the at least one right link pair, wherein the left link gap is offset from the right link gap relative to an axis of the at least one pin.

* * * * *